UNITED STATES PATENT OFFICE.

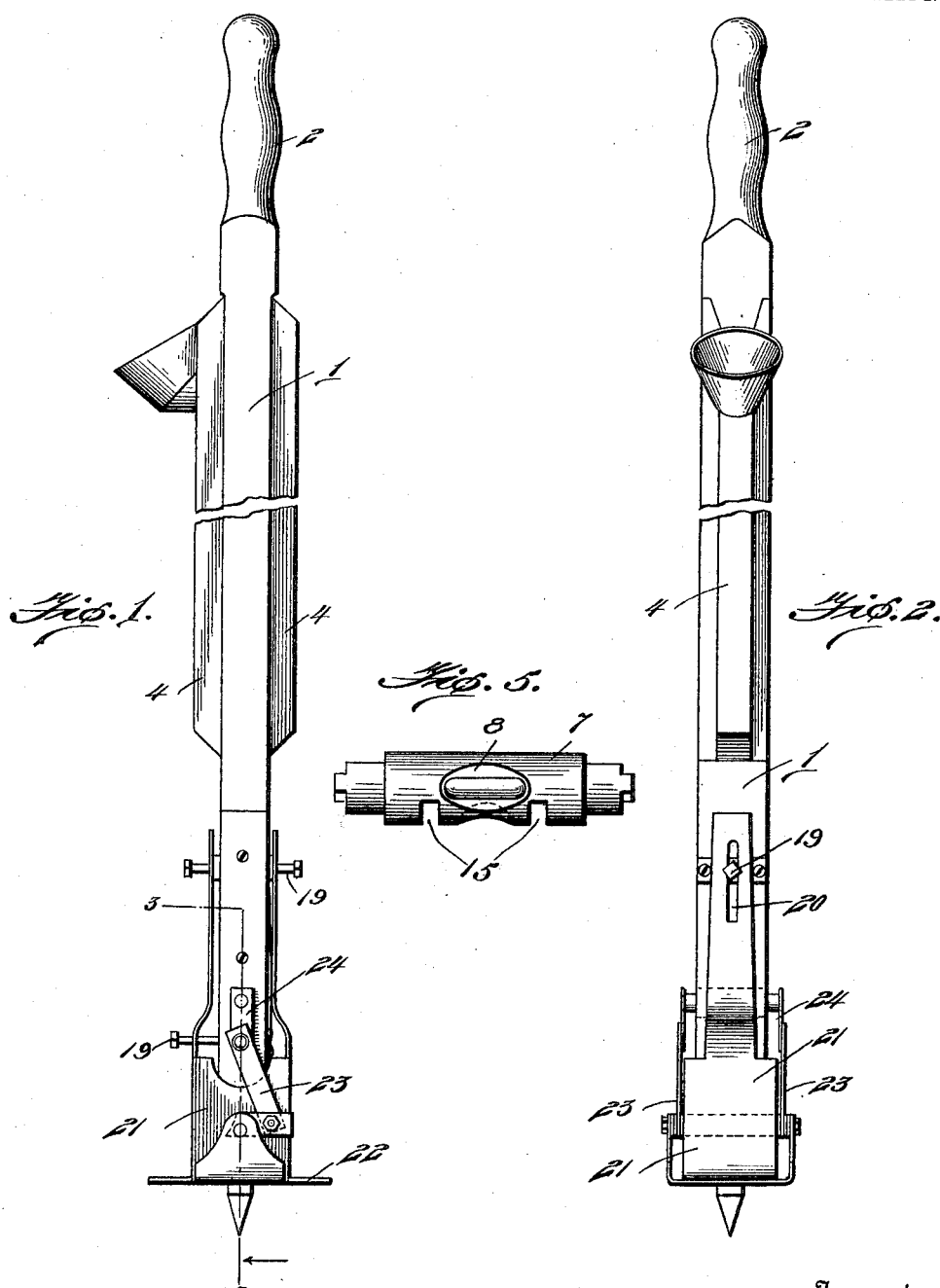

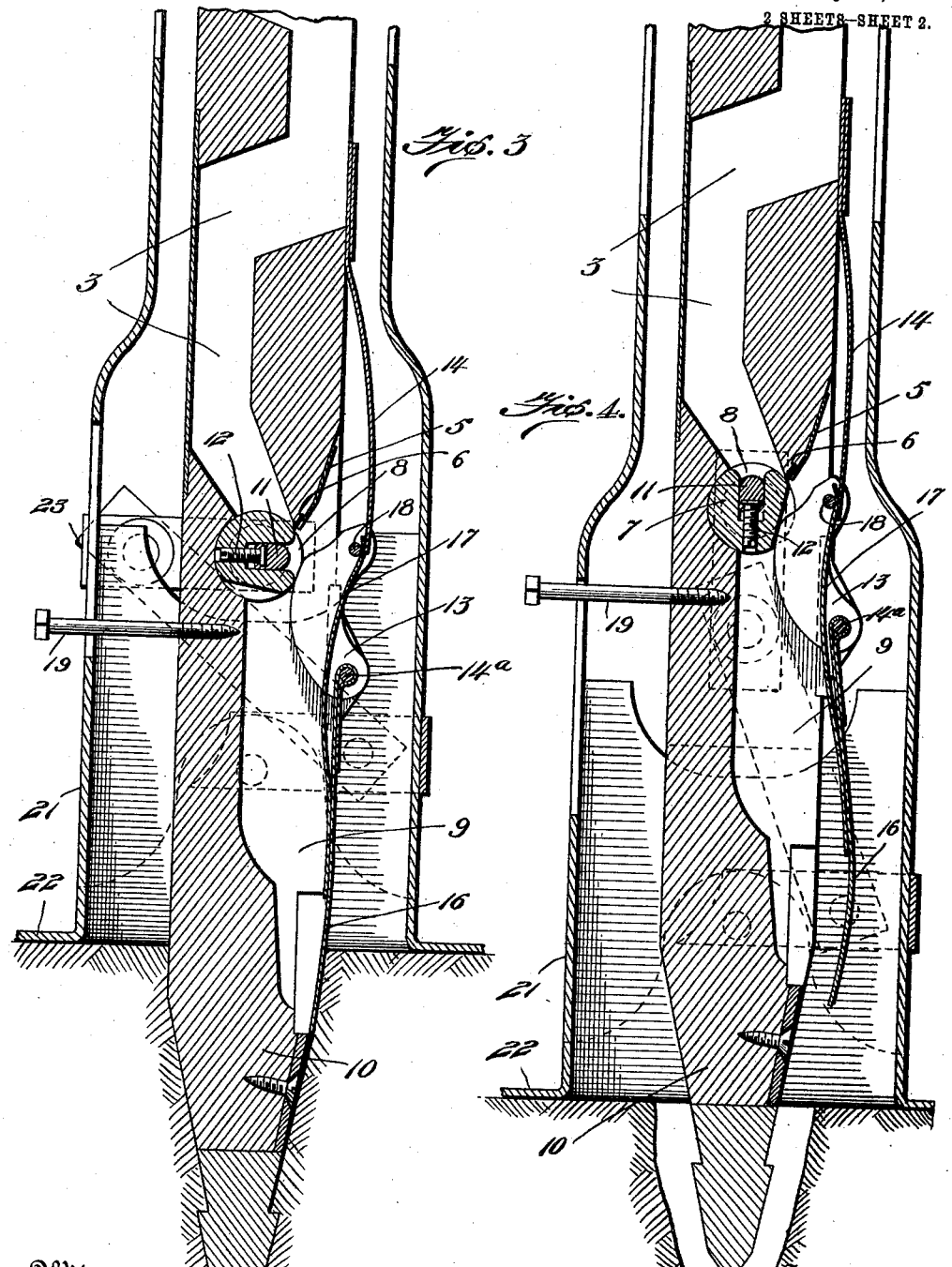

FRANCISCO LOJACONO, OF SAN JUAN, PORTO RICO.

SEED-PLANTER.

1,032,617.  Specification of Letters Patent.  Patented July 16, 1912.

Application filed November 19, 1910, Serial No. 593,140. Renewed December 18, 1911. Serial No. 666,561.

*To all whom it may concern:*

Be it known that I, FRANCISCO LOJACONO, a subject of the King of Italy, residing at San Juan, Porto Rico, have invented certain new and useful Improvements in Seed-Planters, of which the following is a specification.

My invention relates to an improved seed planter, and it consists in the constructions, combinations and arrangements herein described and claimed.

An object of my invention is to provide an improved seed planter adapted for efficient operation with various characters of seeds; such as wheat, corn, peas, etc.

A further object of my invention is to provide a simple and durable seed planter constructed to operate with certainty for automatically depositing any desired number of seeds in each hole formed thereby.

In the accompanying drawings, forming a part of this application and in which similar reference numerals indicate corresponding parts in the several views: Figure 1 is a side elevation, illustrating one embodiment of my invention; Fig. 2 is a front elevation of the construction shown in Fig. 1; Fig. 3 is a detail enlarged section on the line 3—3 of Fig. 1, showing the position of the parts with the digger driven into the earth for forming a planting hole; Fig. 4 is a section similar to Fig. 3, showing the position of the parts when the digger has been fully withdrawn from the earth, and Fig. 5 is a detached elevation of the oscillating conveyer.

Referring to the drawings, 1 indicates a stock provided with any usual handle 2, and formed with a vertically-extending stepped seed reservoir 3, the seed being confined in said stepped reservoir by front and rear casings 4 secured to said stock.

At the lower end of the reservoir 3 is secured a plate 5 carrying a wiper 6 of rubber, or other flexible material, which closely engages the periphery of an oscillating conveyer 7; said conveyer being provided with a pocket 8 for delivering seed from the reservoir 3 to a channel 9 extending to a digger 10 on the lower end of said stock 1.

A block 11 is swiveled to a screw 12 threaded in the conveyer 7 for adjusting said block to a greater or less extent within the conveyer pocket 8; thereby providing a simple and advantageous means for varying the size of said pocket for efficient operation with any desired character or number of seeds.

A pair of dogs or cut-offs 13 are pivoted at 14ª to the stock 1, and maintained by a spring 14 in yielding contact with the periphery of the conveyer 7; said conveyer being provided with a pair of notches 15 for receiving said dogs upon oscillation of said conveyer to its normal loading position as shown in Fig. 4.

A covering plate 16 depends from the pivot 14ª of the spring pressed dogs, 13, and is rigidly attached to a spring 17 confined against a pin 18 on said dogs; thereby providing resilient means for firmly pressing the covering plate 16 against the digger 10 while the latter is being driven into the earth, as shown in Fig. 3.

Bolts 19 extend from opposite sides of the planter stock through slots 20 in a slidable frame 21 for limiting the movements of the latter; said frame being provided with base flanges 22 for engaging the ground, whereby said frame is shifted to its upper position when the digger 10 is forced into the earth. The slidable frame is connected by links 23 to cranks 24 secured on the ends of the oscillatory conveyer 7 for oscillating the latter through approximately 90° during the upward and downward movement of the frame; said frame being normally maintained in its lower position by gravity.

I have illustrated and described preferred and satisfactory constructions, but changes could be made within the spirit and scope of my invention.

Having thus described my invention, what I claim as new and desire to secure by Letters-Patent is:

1. In a seed planter, the combination of spring pressed dogs, a covering plate carried thereby, and an oscillating conveyer provided with peripheral notches for receiving said dogs, substantially as described.

2. In a seed planter, the combination of a stock provided with a seed reservoir, a digger, a covering plate overlapping said digger, a conveyer, and a frame slidably mounted on said stock for automatically actuating said conveyer and covering plate upon the insertion and removal of said digger from the earth, substantially as described.

3. In a seed planter, the combination of a stock provided with a seed reservoir, a digger, a swinging covering plate, an oscillating conveyer, and a frame slidably mounted on said stock for simultaneously actuating said conveyer and covering plate, substantially as described.

4. In a seed planter, the combination of pivoted dogs, a covering plate resiliently supported on said dogs, and an oscillating conveyer actuatingly engaging said pivoted dogs, substantially as described.

5. In a seed planter, the combination of spring pressed dogs, a covering plate resiliently supported on said dogs, an oscillating conveyer actuatingly engaging said dogs, a stock, a digger, and a frame slidably mounted on said stock for oscillating said conveyer upon the insertion and removal of said digger from the earth, substantially as described.

In testimony whereof I affix my signature in presence of two witnesses.

FRANCISCO LOJACONO.

Witnesses:
C. A. BAKER,
G. AYRES.

Copies of this patent may be obtained for five cents each, by addressing the "Commissioner of Patents, Washington, D. C."